(12) United States Patent
Lin et al.

(10) Patent No.: US 6,313,473 B1
(45) Date of Patent: Nov. 6, 2001

(54) DEVICE FOR PRODUCING APODIZED GRATINGS

(75) Inventors: Samuel I-En Lin, Cheng-Nan Le; Win-Yann Jang, Taichung; Iying Wu, Chiai, all of (TW)

(73) Assignee: :Uconn Technology Inc. (TW)

( * ) Notice: Subject to any disclaimer, the term of this patent is extended or adjusted under 35 U.S.C. 154(b) by 0 days.

(21) Appl. No.: 09/311,643

(22) Filed: May 14, 1999

(51) Int. Cl.$^7$ ............................... G02B 6/34; G21K 5/00
(52) U.S. Cl. ........................... 250/492.1; 385/37
(58) Field of Search ............................. 250/492.1; 385/37

(56) References Cited

U.S. PATENT DOCUMENTS

| | | | |
|---|---|---|---|
| 5,104,209 | * 4/1992 | Hill et al. | 385/37 |
| 5,953,471 | * 9/1999 | Espindola et al. | 385/37 |
| 6,043,497 | * 3/2000 | Quetel et al. | 250/492.1 |
| 6,160,261 | * 12/2000 | Hoshino | 250/492.1 |

OTHER PUBLICATIONS

Article entitled "Novel Writing Technique of Long and Highly Reflective In–Fibre Gratings" by J. Martin et al., (Electronics Letters, 12th May 1994, vol. 30, No. 10, pp. 811–812).

Article entitled "Complex Grating Structures With Uniform Phase Masks Based On The Moving Fiber–Scanning Beam Technique" by W.H. Loh et al. (Optics Letters, Oct. 15, 1995, vol. 20 No. 20, pp. 2051–2053).

\* cited by examiner

*Primary Examiner*—Jack Berman
(74) *Attorney, Agent, or Firm*—Michael D. Bednarek; Shaw Pittman LLP

(57) ABSTRACT

A device for producing apodized gratings on a stationary optical fiber. The device includes a slit-generating means, a stationary phase mask and a stationary writing-beam-generating means. A slit is generated by the slit-generating means. A writing beam is generated by the stationary writing-beam-generating means to pass through the slit and the stationary phase mask and then focus on the stationary optical fiber for a plurality of exposure time periods. The slit is adjustable in width so that the slit has a plurality of widths during the plurality of exposure time periods, respectively.

4 Claims, 3 Drawing Sheets

DEVICE FOR PRODUCING APODIZED GRATINGS

BACKGROUND OF THE INVENTION

1. Field of the Invention

The present invention relates in general to a device for producing apodized gratings.

2. Description of the Related Art

Apodized gratings are particularly important for telecommunications applications, such as dense wavelength division multiplexing and dispersion compensation, because well-designed apodization profiles can considerably suppress the sidelobes in the grating reflection spectra. J. Martin et al. disclosed a method of producing apodized gratings (ELECTRONICS LETTERS, May 12, 1994, Vol.30, No.10, pp.811–812). Referring to FIG. 1, an optical fiber 11 and a phase mask 12 are movably mounted on a translation stage 13, wherein the optical fiber 11 is placed behind the phase mask 12. Then, a UV beam 14 is projected through the phase mask 12 to write gratings on the optical fiber 11. In this method, however, any offset of the beam position relative to the optical fiber center during the translation results in a corresponding variation of the average refractive index of the optical fiber. The variation of the average refractive index imparts an often undesired chirp to the gratings. To resolve such a problem, W. H. Loh et al. disclosed a moving fiber-scanning beam technique (OPTICS LETTERS, Oct. 15, 1995, Vol.20, No.20, pp.2051–2053). Referring to FIG. 2, an optical fiber 21 is mounted on a computer-controlled stage 23 which slowly moves with respect to a phase mask 22. A UV beam 24 is reflected by a moving mirror 25 to pass through the phase mask 22 so as to write gratings on the optical fiber 21. By the movement of the UV beam, variation of the average refractive index of the optical fiber is totally avoided because the average UV fluence along the length of the grating is the same. However, simultaneously control of the movement of the stage 23 and the mirror 25 is required in this system. Such a system is very complex.

SUMMARY OF THE INVENTION

An object of the present invention is to provide a device that solves the above-mentioned problems.

In accordance with the object of the present invention, a device for producing apodized gratings on a stationary optical fiber is provided. The device includes a slit-generating means, a stationary phase mask and a stationary writing-beam-generating means. A slit is generated by the slit-generating means. A writing beam is generated by the stationary writing-beam-generating means to pass through the slit and the stationary phase mask and then focus on the stationary optical fiber for a plurality of exposure time periods. The slit is adjustable in width so that the slit has a plurality of widths during the plurality of exposure time periods, respectively.

In the present invention, neither the UV-generating means nor the optical fiber is moved. Therefore, controlling the device of the present invention is much simpler than controlling the device of the prior art. In addition, the problem of chirps does not arise because the UV-generating means does not move with respect to the optical fiber.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
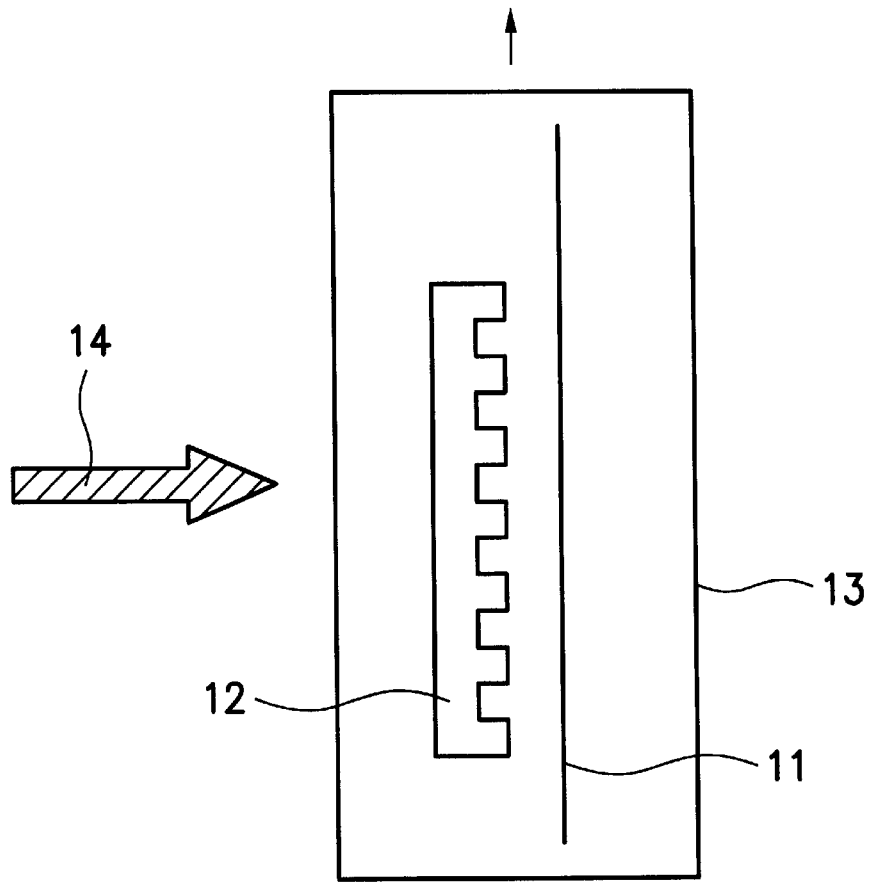
FIG. 1 is a schematic diagram of a device for producing apodized gratings in accordance with a first example of the prior art.
Figure 2:
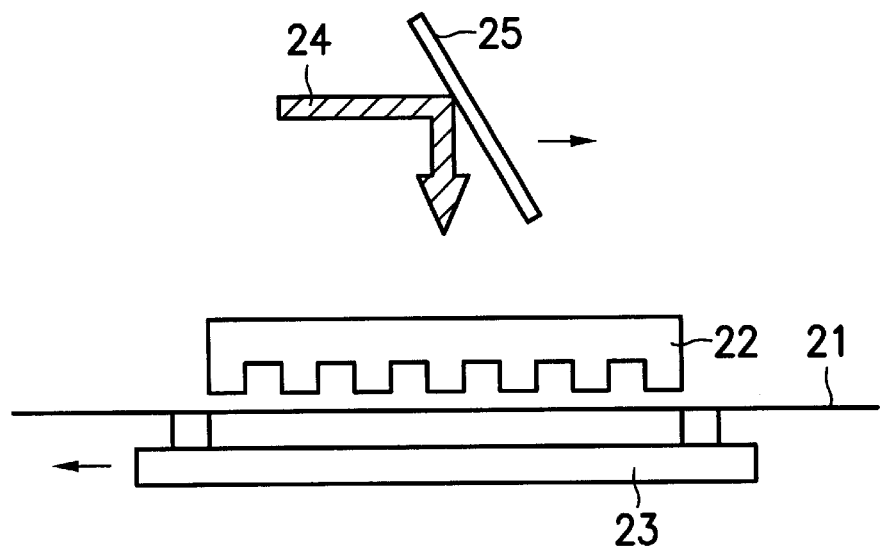
FIG. 2 is a schematic diagram of a device for producing apodized gratings in accordance with a second example of the prior art.
Figure 3:
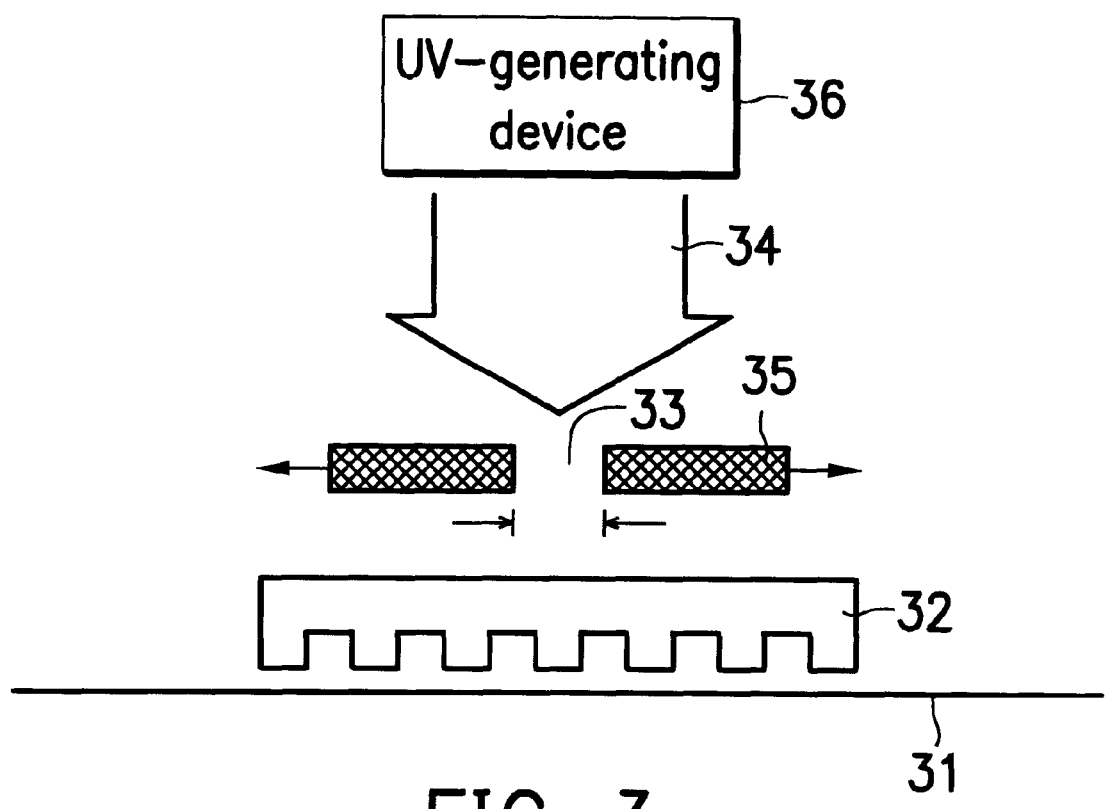
FIG. 3 is a schematic diagram of a device for producing apodized gratings in accordance with the present invention.
Figure 4A:
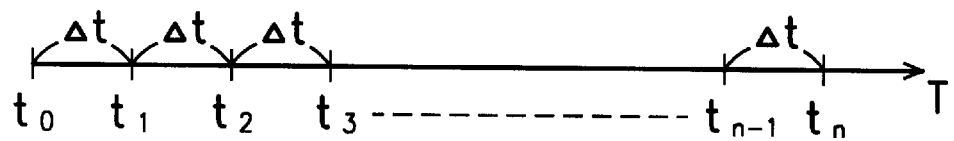
FIG. 4A shows the exposure time periods in accordance with a first example of the present invention.

Referring to FIG. 3, a device for producing apodized gratings of the present invention includes a phase mask 32, a slit-generating means 35 and a UV-generating means 36. The slit-generating means 35 can generate a slit 33 of adjustable width "W". In operation, a UV beam 34 emitted from the UV-generating means 36 passes through the slit 33 and the phase mask 32 to focus on an optical fiber 31. That is, gratings are written on the optical fiber 31. It is noted that in the operation the UV beam 34, the phase mask 32 and the optical fiber 31 are stationary. On the other hand, the slit-generating means 35 operates to change the width "W" of the slit 33 through which the UV beam 34 passes. The change of the slit width can be accomplished in two different ways:

(1) Referring to FIG. 4A, the original time is $t_o$. The optical fiber 31 is exposed to the UV beam 34 through a slit width "$W_1$" in the time interval $t_o \leq T \leq t_1$, wherein the exposure time is $\Delta t$ $(=t_1-t_o)$. Then, the slit width is changed from $W_1$ to $W_2$, and the optical fiber 31 is exposed to the UV beam 34 through the slit width "$W_2$" in the time interval $t_1 \leq T \leq t_2$, wherein the exposure time is also $\Delta t$. Then, the slit width is changed from $W_2$ to $W_3$, and the optical fiber 31 is exposed to the UV beam 34 through the slit width "$W_3$" in the time interval $t_2 \leq T \leq t_3$, wherein the exposure time is still $\Delta t$. By analogy, the slit width is changed from $W_{n-1}$ to $W_n$, and the optical fiber 31 is exposed to the UV beam 34 through the slit width "$W_n$" in the time interval $t_{n-1} \leq T \leq t_n$, wherein the exposure time is still $\Delta t$. In this example, every exposure time for every slit width is the same $(=\Delta t)$ while the slit widths are mutually different $(W_1 \neq W_2 \neq W_3 \neq \ldots \neq W_n)$.

Figure 4B:
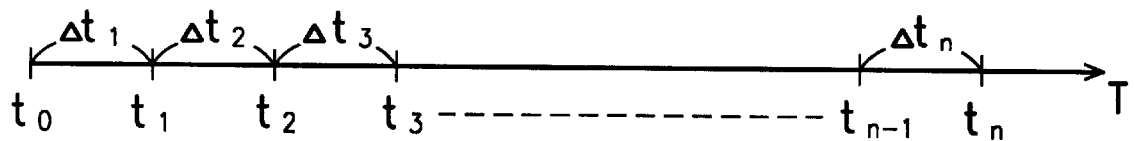
FIG. 4B shows the exposure time periods in accordance with a second example of the present invention.

(2) Referring to FIG. 4B, the original time is $T=T_o$. The optical fiber 31 is exposed to the UV beam 34 through a slit width "W" in the time interval $t_o \leq T \leq t_1$, wherein the exposure time is $\Delta t_1$. Then, the slit width is changed from "W" to "W+$\Delta$W", and the optical fiber 31 is exposed to the UV beam 34 through the slit width "W+$\Delta$W" in the time interval $t_1 \leq T \leq t_2$, wherein the exposure time is $\Delta t_2$ and $\Delta t_2 \neq \Delta t_1$. Then, the slit width is changed from "W+$\Delta$W" to "W+2$\Delta$W", and the optical fiber 31 is exposed to the UV beam 34 through the slit width "W+2$\Delta$W" in the time interval $t_2 \leq T \leq t_3$, wherein the exposure time is $\Delta t_3$ and $\Delta t_3 \neq \Delta t_2$. By analogy, the slit width is changed from "W+(n-1)$\Delta$W" to "W+n$\Delta$W", and the optical fiber 31 is exposed to the UV beam 34 through the slit width "W+n$\Delta$W" in the time interval $t_{n-1} \leq T \leq t_n$, wherein the exposure time is $\Delta t_n$ and $\Delta t_n \neq \Delta t_{n-1}$. In this example, the differences among the slit widths are the same $(=\Delta W)$ while the exposure time is adjustable $(\Delta t_1 \neq \Delta t_2 \neq \Delta t_3 \ldots \neq \Delta T_n)$.

By changing the exposure time and slit width, we can produce apodized gratings of any mathematical functions on the optical fibers. Furthermore, in the present invention, neither the UV-generating means nor the optical fiber is moved. Therefore, controlling the device of the present invention is much simpler than controlling the device of the prior art. The problem of chirps does not arise because the UV-generating means does not move with respect to the optical fiber.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded with the broadest interpretation so as to encompass all such modifications and similar arrangements.

What is claimed is:

1. A device for producing apodized gratings on a stationary optical fiber, comprising:

a slit-generating means for generating a slit;

a stationary phase mask; and a stationary writing-beam-generating means for generating a writing beam which passes through the slit and the stationary phase mask and then focuses on the stationary optical fiber for a plurality of exposure time periods;

wherein the slit is adjustable in width so that the slit has a plurality of widths during the plurality of exposure time periods, respectively.

2. A device for producing apodized gratings on a stationary optical fiber as claimed in claim 1, wherein the writing beam is an ultraviolet beam.

3. A device for producing apodized gratings on a stationary optical fiber as claimed in claim 1, wherein the plurality of exposure time periods are the same while the plurality of widths are mutually different.

4. A device for producing apodized gratings on a stationary optical fiber as claimed in claim 1, wherein differences between the plurality of widths are the same while the plurality of exposure time periods are mutually different.

* * * * *